United States Patent
Knoll

[11] 3,866,492
[45] Feb. 18, 1975

[54] TORQUE MULTIPLIER
[75] Inventor: William A. Knoll, Santa Ana, Calif.
[73] Assignee: Jo-Line Tools, Inc., Anaheim, Calif.
[22] Filed: Mar. 6, 1974
[21] Appl. No.: 448,455

[52] U.S. Cl. .............................................. 81/52.4 R
[51] Int. Cl. ...................................................... B25b
[58] Field of Search ................................ 81/52.4 R

[56] References Cited
UNITED STATES PATENTS
2,130,111  9/1938  Whitney et al. .................. 81/52.4 R
3,016,773  1/1962  Woods ............................. 81/52.4 R FOREIGN PATENTS OR APPLICATIONS
554,830  7/1943  Great Britain ................... 81/52.4 R
208,036  5/1957  Australia ......................... 81/52.4 R Primary Examiner—James L. Jones, Jr.
Attorney, Agent, or Firm—Fulwider, Patton, Rieber, Lee & Utecht

[57] ABSTRACT

There is disclosed a tool having a torque multiplier mechanism with limit means to disengage the torque multiplying mechanism when a predetermined torque loading is reached. When this loading is achieved, the tool switches the applied torque to a detent mechanism which provides a direct drive. The tool comprises a housing with a through opening in which is mounted a planetary cage that is formed of a work-receiving member and an opposite spider member with a plurality of planetary gears rotatably mounted therebetween. A ring gear is also mounted in the through opening and is engaged with the planetary gears. Detent means are carried on the outer periphery of the ring gear to engage the first of a pair of toggle members which are also carried in the housing and which are resiliently biased into engagement with the detent means. The planetary cage carries detent teeth on its outer periphery and the housing pivotally supports a pawl. The second toggle member carries resilient pawl actuation means which are operative to pivot the pawl into engagement with the detent teeth when the toggle members are rocked out of their in-line relationship by the application of a torque to the tool which is in excess of the predetermined and limiting torque loading.

11 Claims, 4 Drawing Figures

TORQUE MULTIPLIER

BACKGROUND OF THE INVENTION

1. Field of the Invention

This invention relates to a torque multiplying tool, and, in particular, to an improvement in a drive tool for use with socket wrenches and the like.

2. Description of the Prior Art

Variable-torque driver tools are known and are used in a number of applications. The high speed operations required in assembly lines have been satisfied by a number of nut-running tools which have means to provide variable speeds and torques to the nut-driving member. Typically, these tools have employed planetary clutches with the torque from the driving motor being applied through the ring gear, planetary gear spider or sun gear to achieve a variation in the torque from the nut driver. Typical of such assembly line tools are those described in U.S. Pat. Nos. 3,319,494; 3,507,173; 3,529,513 and 3,696,871.

Portable tools which are used on large fasteners such as those encountered in high-rise buildings, bridges, helicopter rotor hubs, etc., have also employed a torque multiplying mechanism which, frequently, is a planetary gear mechanism. A common difficulty with the aforementioned tools is the absence of any limitation on the magnitude of the torque which can be applied by the tool, often resulting in damage to the multiplier mechanism of the tool or in failure of the fastener during the final tightening. It is, therefore, desirable to provide torque limiting means whereby the magnitude of the applied torque can be controlled from exceeding a predetermined, maximum limit. Preferably, it is also desirable to provide means whereby the tool shifts to a lesser, torque-multiplying advantage when the limiting torque has been reached. This insures that a greater resistance will be present because the torque multiplier mechanism is released, thereby avoiding damage to the driver power unit or injury to workmen due to sudden reduction of resisting torque to zero caused by failure of the fastener or tool.

SUMMARY OF THE INVENTION

The invention comprises a torque multiplier tool with a torque limiting mechanism that is operative to shift the tool from a high, multiple torque advantage to a direct drive relationship when a predetermined, maximum torque loading has been reached. In a preferred embodiment, the tool shifts from the torque multiplier mechanism to a direct-drive mechanism when the predetermined torque limit is reached. In its most preferred embodiment, the tool has means whereby the predetermined and limiting torque loading may be adjustably fixed.

The torque multiplier tool comprises a housing having a through opening and, rotatably mounted therein, a planetary cage assembly formed of a work-receiving member and opposite spider member with a plurality of planetary gears rotatably mounted therebetween. The spider member carries an idler shaft having pinion means to provide a sun gear that is engaged with the planetary gears. A ring gear is mounted in the through opening, surrounding and in engagement with the planetary gears. The ring gear bears a detent on its outer periphery and, engaged with the detent, is the first of a pair of toggle members which are resiliently biased in an in-line relationship by spring means carried on the tool. The planetary cage also carries external detent teeth and the housing pivotally supports a pawl opposite to these teeth. The second toggle member bears resilient pawl actuation means which controls the position of the pawl. When the torque loading on the ring gear is sufficient to exceed the resilient biasing of the in-line relationship of the first and second toggle members, the latter are deflected to a buckled position. When the toggle members are moved to their buckled position, the pawl is urged into engagement with the external ratchet teeth on the planetary cage by the resilient pawl actuation means carried by the second toggle member, thereby shifting the tool from the planetary drive mechanism to a direct drive.

In a preferred embodiment, the spring means for resiliently biasing the pair of toggle members in an in-line relationship bears against a stop which is adjustable to adjustably fix the tension applied to the pair of toggle members whereby the value of limiting torque loading of the torque multiplier tool may be adjustably fixed.

DESCRIPTION OF THE PREFERRED EMBODIMENT

Figure 1:
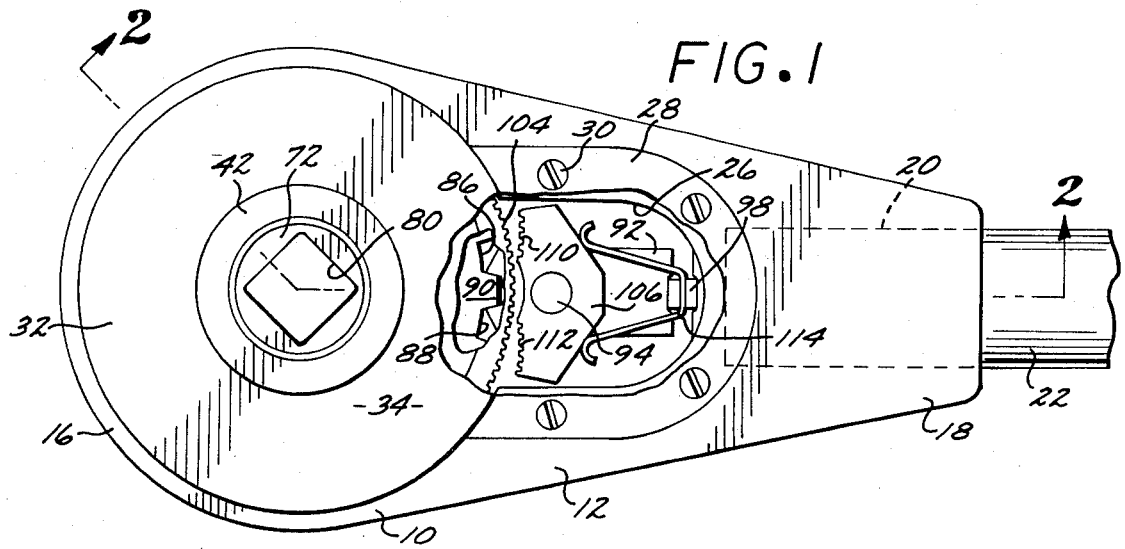
FIG. 1 is a plan view of the tool housing.
Figure 2:
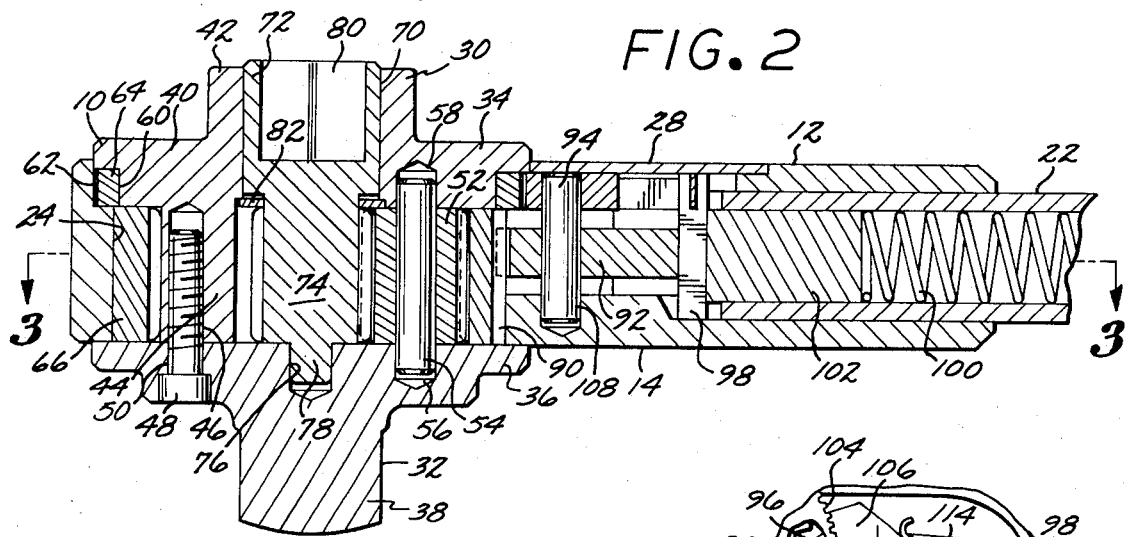
FIG. 2 is a sectional view along lines 2—2 of FIG. 1.

Referring now to FIGS. 1 and 2, the torque multiplier tool is shown as comprising a housing 10 which has generally parallel, upper face 12 and lower face 14. The housing is shaped at one end with a generally circular configuration, shown as 16, and tapers at its opposite end 18. The tapered end 18 bears a bore 20 which receives handle 22. The opposite, circular end of the tool bears a through opening 24 which is contiguous with an intermediate housing cavity 26 that is covered by removable plate 28. The plate 28 is secured by a plurality of screw fasteners 30 which thread into tapped bores about the periphery of the intermediate housing cavity 26.

Rotatably mounted within the through opening is a planetary cage assembly 30. This cage assembly is formed of the work-receiving member 32 and spider member 34.

The work-receiving member has an upper flat circular flange 36 and a coaxial, downwardly directed, shank 38. The shank 38 can be provided with means for engagement of work, typically it can be polygonal in cross section to fit the driver connecting apertures of sockets.

Spider member 34 also has a flat flange 40 with an upper boss 42 and a plurality of coextensive, radially disposed legs 44 which extend into engagement with the flat, upper surface of work-receiving member 32. The legs 44 are bored and tapped at 46 to receive screw fasteners in the form of machine screws 48 which extend through radially disposed bores 50 in flange 36 of the work-receiving member.

Figure 3:
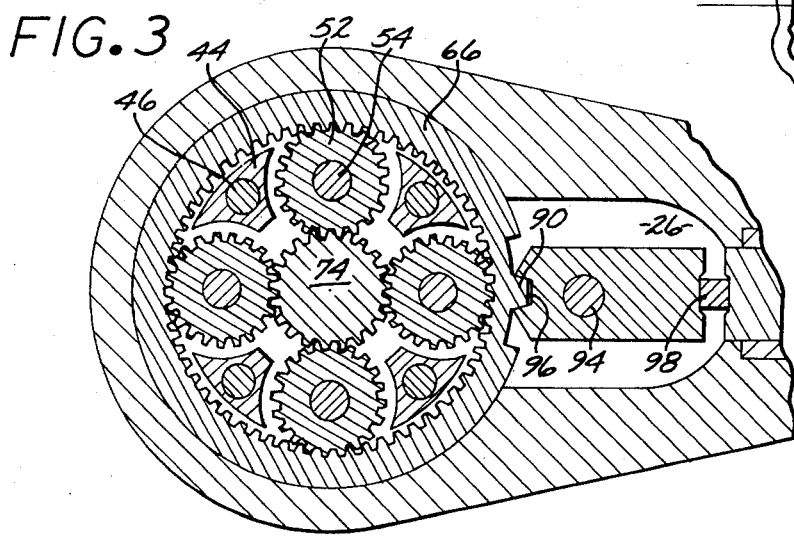
FIG. 3 is a sectional view along lines 3—3 of FIG. 2.

The cage supports a plurality of planetary gears 52 in the radial array as shown in FIG. 3. Each planetary gear 52 is rotatably mounted on a spindle 54 that is carried in opposed bores 56 and 58 in each of the work-receiving member 32 and spider member 34, respectively.

The inward face of flange 40 of spider 34 bears an annular groove 60. The upper end of the housing also bears an annular groove 62 about through opening 24 to provide a pair of opposed shoulders between which is positioned stop ring 64.

A ring gear 66 is also mounted within the through opening 24, surrounding and in engagement with the planetary gears 52 as illustrated in FIGS. 2 and 3. Spider member 34 has a central bore 70 in which is rotatably mounted idler means 72. The idler means 72 is formed with a pinion 74 which, as shown in FIGS. 2 and 3, is in engagement with the planetary gears 52 and thereby functions as the sun gear of the planetary mechanism. The work-receiving member has a central bore 76 to receive the shaft end 78 of the idler member 72. Preferably, the outboard end of idler means 72 bears a polygonal cavity 80 to accept the work-receiving member of another driver mechanism. A split ring 82 is provided about the shank portion 74 of the idler 72 to take the axial or thrust loads.

The ring gear 66 bears a detent on its outer periphery. The detent is shown as formed by two axial grooves 86 and 88 which define a central tooth 90 therebetween. The detent is shown in plan view in FIGS. 1 and 3 and in elevation in the sectional view of FIG. 2.

The detent, i.e., tooth 90, is engaged by a pair of toggle members which are best illustrated in FIGS. 2 and 3. The toggle members comprise a first toggle member 92 which is pivotally supported within cavity 26 by pin 94 and which has a groove 96 that engages tooth 90. The opposite end of toggle member 92 is engaged with the second toggle member 98, the latter being in the form of a square pivot pin.

Resilient means such as compression spring 100 are carried on the tool, preferably in the handle, to bias the toggle members into an in-line relationship. The spring 100 bears against piston 102 that is slidably mounted in handle 22 to transmit the tension of spring 100 to toggle member 98. When the toggle members are in their in-line position, any torque from the handle of the tool is transmitted to the ring gear and through the planetary gear mechanism to work-receiving member 32 at the torque multiplier advantage of the planetary gear mechanism.

The outer periphery of the planetary cage assembly bears teeth 104 which extend into the intermediate cavity 26 that is contiguous with the through opening 24 of the tool. Pivotally mounted within the intermediate cavity 26 is pawl 106. Conveniently, the pawl can be pivotally supported on the aforedescribed pin 94 which is mounted in bore 108 that is tapped into the interior bottom wall of cavity 26. Pawl 106 has opposite wing portions which bear arcuate rows of teeth, 110 and 112, which will mesh into engagement with teeth 104 of the planetary cage when pawl 106 is pivoted about pin 94.

Figure 4:
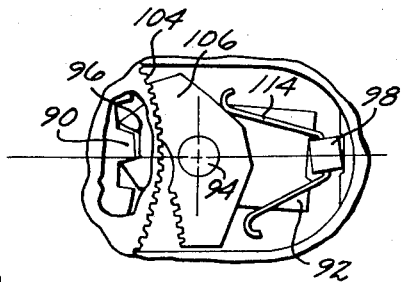
FIG. 4 is an illustration of the engaged position of the detent mechanism of the tool.

The second toggle member carries resilient means to bias the pawl into and out of engagement with teeth 104 of the planetary cage. This resilient means is shown in FIG. 1 in the form of bifurcated spring 114 having legs which extend into bearing contact on the rear edges of the wings of pawl 106. When the pair of toggle members, 92 and 98, are in the in-line relationship shown in FIGS. 1 and 3, the spring means 114 is operative to position pawl 106 into disengagement from teeth 104, as illustrated in FIG. 1. When the pair of toggle members 92 and 98 are buckled out of their in-line relationship, the square toggle member 98 rotates and transmits a pivotal force to pawl 106 through spring 114, thereby pivoting the arcuate set of teeth, 110 and 112, into engagement with the detent teeth 104 on the planetary cage. This position of the members is illustrated in FIG. 4. The buckling of the toggle members 92 and 98 results from the application of a torque loading to the tool which is sufficient to apply a rotational force to toggle member 92 that is of a sufficient magnitude to cause this member to overcome the resilient force applied by spring 100 and piston 102 to the toggle assembly, thereby rotating toggle member 92 about pin 94.

In a preferred and illustrated embodiment, the planetary gear mechanism has four planetary gears 52 which are of the same diameter as the sun gear 74, thereby providing a four-to-one mechanical advantage of torque applied to the ring gear 66. Obviously, the relative sizes of the planetary and sun gears can be varied to provide a various mechanical advantage to these tools as apparent to those skilled in the art. The illustrated device also shows a compression coil spring 100 as the resilient means to bias the pair of toggle members into their in-line relationship. Obviously, other resilient means could be employed, e.g., a stacked array of Belleville springs could be employed to provide a very compact resilient means.

As previously mentioned, the multiplier tool can also have means to provide an adjustable fixed setting of the limiting torque value. This can be provided by biasing the outboard end of spring means 100 against an adjustable stop, not shown in the illustration. Such an adjustable stop can be provided in a facile manner by threading the inner periphery of the hollow tubular handle 22 and placing set screw means therein so that the advance of the set screw in its threaded engagement within handle 22 will increase the resilient bias on the pair of toggle members, and, hence, increase the limiting torque loading setting of the multiplier tool. Similarly, retraction of the adjustable stop means for spring 100 would reduce the limiting value of the torque loading of the tool.

The torque multiplier tools can be provided with a plurality of useful load ratings. Typically, torque loadings as high as about 10,000 foot pounds, preferably about 8,000 foot pounds, and, most preferably from about 2,000 to 8,000 foot pounds, can be readily provided in a manually operated tool such as illustrated in the Figures. A typical embodiment of the illustrated tool would have a maximum torque loading of about 2,000 foot pounds which is released to a value of 500 foot pounds when the maximum loading is exceeded.

The invention has been described with reference to the illustrated and presently preferred mode of practice thereof. It is not intended that this illustration be unduly limiting of the invention. Instead, it is intended that the means and their obvious equivalents set forth in the following claims be within the scope of the invention.

I claim:

1. A torque multiplier tool with a torque limiting mechanism which comprises:

a. a housing having a through opening;
 b. a planetary cage rotatably carried in said through opening and formed of a work-receiving member and an opposite spider member with a plurality of planetary gears rotatably mounted therein;

c. shaft means coaxially carried by said spider member and bearing pinion means engaged as a sun gear with said planetary gears;

d. a ring gear mounted in said through opening, surrounding and engaged with said planetary gears and bearing a detent on its outer periphery;

e. first and second toggle members carried by said housing with resilient means biasing said toggle members into an in-line relationship with said first toggle member engaging said detent;

f. detent teeth carried on an outer peripheral surface of said planetary cage;

g. a pawl pivotally carried on said housing and bearing teeth to mesh with the ratchet teeth on said planetary cage; and h. resilient pawl actuation means carried by said second toggle member whereby movement of said toggle members from said in-line relationship will rock said pawl into engagement with said detent teeth.

2. The torque multiplier tool of claim 1 wherein said pawl is formed with opposite wings, each wing bearing a set of teeth which, when the pawl is pivoted, will move into and out of engagement with said detent teeth on said planetary cage.

3. The torque multiplier tool of claim 1 wherein said second toggle member comprises a square pin and said resilient means comprises a bifurcated spring carried on said square pin with the legs thereof resiliently biased against the opposite wing edges of said pawl.

4. The torque multiplier tool of claim 1 wherein said detent comprises tooth means carried on the periphery of said ring gear and engaged with mating notch means carried on the opposed end of the first toggle member.

5. The torque multiplier tool of claim 1 wherein said shaft means bears a polygonal cavity in its outer end which is suitable for receiving the work-receiving member of a driver tool.

6. The torque multiplier tool of claim 1 wherein the means biasing said members into an in-line relationship comprises a compression coil spring.

7. The torque multiplier tool of claim 6 wherein said compression coil spring is carried in the handle of said tool.

8. The torque multiplier tool of claim 1 wherein said resilient means bears against adjustable stop means.

9. The torque multiplier tool of claim 7 wherein the outboard end of said handle carries a threaded insert that functions as adjustable stop means for said resilient means whereby the setting of the maximum torque loading of said tool can be adjustably fixed.

10. The torque multiplier tool of claim 1 wherein said housing has an intermediate cavity which is contiguos with said through opening and said toggle members and pawl are mounted in said intermediate cavity.

11. The torque multiplier tool of claim 10 wherein said housing is bored at its end thereof opposite said through opening to receive said handle.

* * * * *